United States Patent [19]
Wheatley et al.

[11] Patent Number: 6,024,401
[45] Date of Patent: Feb. 15, 2000

[54] TONNEAU COVER WITH BALL AND SOCKET REAR RAIL LATCH

[76] Inventors: Donald G. Wheatley, 4451 Ford Rd.; Donald E. Wheatley, 1119 Wright St., both of Ann Arbor, Mich. 48105

[21] Appl. No.: 08/762,294

[22] Filed: Dec. 9, 1996

[51] Int. Cl.[7] .................................................. B60P 7/04
[52] U.S. Cl. .............................. 296/100.18; 296/100.17; 403/326
[58] Field of Search ................ 296/100.01, 100.17, 296/100.18; 403/327, 328, 326; 285/317, 424; 29/441.1, 446

[56] References Cited

U.S. PATENT DOCUMENTS

| | | | |
|---|---|---|---|
| D. 333,607 | 3/1993 | Isler | D8/382 |
| 2,216,878 | 10/1940 | Densmore | 29/441.1 |
| 3,214,187 | 10/1965 | Fuerst | 403/328 X |
| 4,026,605 | 5/1977 | Emmerich | 299/107 |
| 4,114,927 | 9/1978 | Butcher | 285/317 X |
| 4,607,973 | 8/1986 | Wilke | 403/328 X |
| 4,730,866 | 3/1988 | Nett | 296/100.18 |
| 5,011,324 | 4/1991 | Putney | 403/328 |
| 5,261,719 | 11/1993 | Tucker | 296/100.18 |
| 5,275,458 | 1/1994 | Barben et al. | 296/100.18 |
| 5,381,707 | 1/1995 | Gill | 403/328 X |
| 5,511,843 | 4/1996 | Isler et al. | 296/100.17 |

FOREIGN PATENT DOCUMENTS

| | | | |
|---|---|---|---|
| 766486 | 1/1957 | United Kingdom | 403/328 |

*Primary Examiner*—D. Glenn Dayoan
*Assistant Examiner*—Jason Morrow
*Attorney, Agent, or Firm*—Harness, Dickey & Pierce, P.L.C.

[57] ABSTRACT

A tonneau cover for covering the cargo box of a pick-up truck in which the rear frame rail of the tonneau cover is attached to the frame side rails by ball and socket latch assemblies. The ball and socket latch assemblies replace thumb screws to provide an inexpensive, tool free attachment of the rear frame member. This enables the rear frame member to be removed from the tonneau cover frame when large objects are loaded into the cargo box without the use of tools and without the risk of using threaded fasteners such as a thumb screws.

7 Claims, 2 Drawing Sheets

TONNEAU COVER WITH BALL AND SOCKET REAR RAIL LATCH

BACKGROUND AND SUMMARY OF THE PRESENT INVENTION

The present invention relates to a tonneau cover for a pick-up truck cargo a box and in particular to a ball and socket latch for attaching the rear or tailgate rail of the tonneau cover frame to the frame side rails.

Several different types of tonneau covers have been developed for covering the cargo box of a pick-up truck. One popular type of tonneau cover is a soft cover employing a flexible sheet, such as an automotive type of vinyl sheet, to cover the cargo box. The flexible sheet has fasteners about its periphery which are used to attach the sheet to a rectangular frame. The rectangular frame is attached to the sidewalls of the cargo box. A typical frame includes side rails which are positioned on the cargo box sidewalls and clamped, coupled or otherwise secured thereto. Front and rear frame rails are attached to the two frame side rails to complete the rectangular frame. The front rail rests upon the front wall of the cargo box while the rear rail rests upon the tailgate. The front and rear rails are typically not themselves attached to the cargo box. The frame is held in place solely by attaching the side rails to the cargo box.

Since the rear frame rail is not fastened to the tailgate, it is possible to leave the tonneau cover in place and lower the tailgate to access the cargo box to load objects which fit under the tonneau cover. To load larger objects, it is necessary to remove the flexible sheet. This is done by releasing the flexible sheet from the side rails and the rear frame rail. The cover is rolled forward and is tied to the front rail of the frame at the front of the cargo box. When the tailgate is opened, it is necessary to remove the rear frame rail which spans across the now open rear of the cargo box in order to load large objects. Thumb screws are typically used to attach the rear frame rail to the frame side rails so that the rear rail can be easily removed without the use of tools when necessary. However, when the rear frame rail is not in use and is lying in the cargo box, it is possible for the thumb screws to vibrate loose from the rear rail and become lost. In addition, thumb screws are expensive compared to regular screws and other fasteners.

Accordingly, it is an object of the present invention to provide a fastening means for attaching the rear rail of the tonneau cover frame to the side rails which cannot become separated and lost.

It is a further object to provide a fastening means which does not require tools to remove and re-install the rear rail.

The tonneau cover of the present invention attaches a rear frame rail to the two side rails with the use of a ball and socket latch at each end of the rear rail. The latch end includes a ball which is spring biased into an aperture in the side rails to latch the rear frame rail in place. The ball is carried in a housing which is fixed to one of the die cast corner blocks of the tonneau cover frame. The corner blocks each have a forward extending leg which is inserted into the rear end of one of the side rails. A spring pushes the ball so that it projects through an opening at the end of the cylinder. The ball extends sufficiently to project into an aperture in the side rail. This latches the rear frame rail to the two side rails. The biasing spring provides sufficient force to hold the rear frame rail in place so that during vehicle operation, without the tonneau cover attached, the rear rail is retained on the two side rails.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
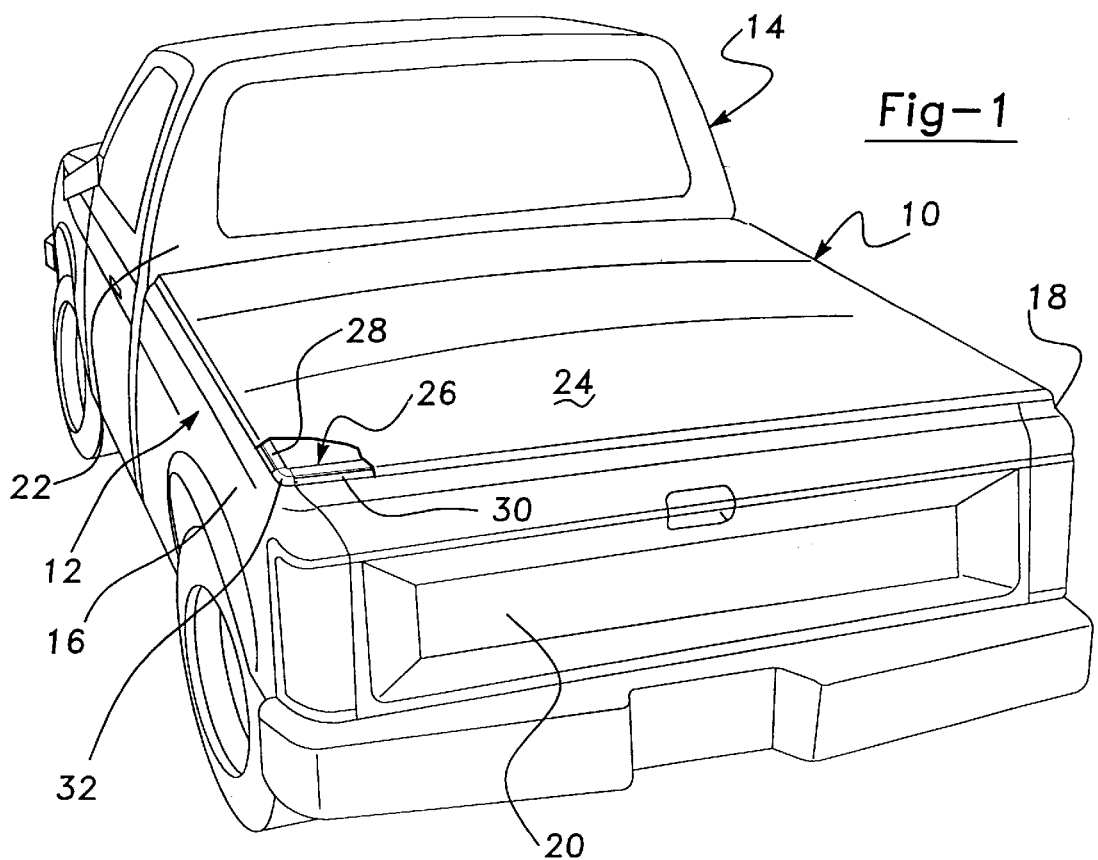
FIG. 1 is a perspective view of a pick-up truck having a tonneau cover installed thereon which uses the ball and socket rear frame rail latch of the present invention.

The tonneau cover of the present invention is shown in FIG. 1 and designated generally at 10. Tonneau cover 10 is shown installed on the cargo box 12 of a pick-up truck 14. The cargo box has spaced sidewalls 16 and 18, a rear tailgate 20 and a front wall (not shown) immediately behind the truck cab 22.

The tonneau cover 10 includes a flexible sheet 24. The sheet 24 is typically made of a vinyl coated fabric. The sheet is pulled tight over the cargo box and attached to a rectangular frame 26, a portion which is shown in FIG. 1. Frame 26 has a pair of side rails 28, only one of which is shown, which are positioned upon the top of the cargo box side walls 16 and 18. The frame 26 further includes a rear frame rail 30 which extends across the upper end of the tailgate 20 and a front frame rail which extends across the top of the cargo box front wall. The frame side rails, front rail and rear rail are assembled together end-to-end to form a rectangular frame of the same size and shape as the cargo box. Typically the frame rails are formed as metal or plastic extrusions and employ a uniform cross sectional shape although other manufacturing methods may be used and the rails may differ in cross sectional shape.

Figure 2:
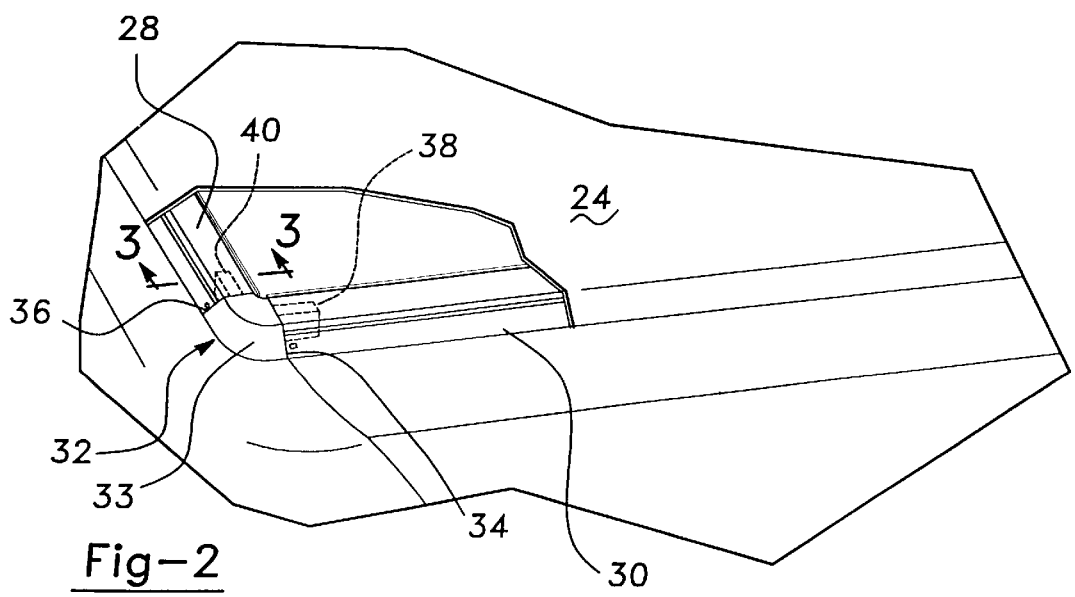
FIG. 2 is an enlarged perspective view showing the rear corner of the tonneau cover frame.

The frame rails are joined together at the corners of the frame by molded or die cast corner blocks 32. The corner blocks have a body 33 with two end faces 34 and 36 which are at a 90° angle to each other. The two end faces 34 and 36 abut the ends of the adjacent frame rails as shown in FIG. 2. Legs 38 and 40 extend from the end faces 34 and 36, respectively, and are inserted into hollow channels 42 in the cross-section of each of the frame rails. The leg 38, which extends into the rear frame rail 30, is secured there in by a screw or other fastener threaded into the rear frame rail and into the mounting tab. Screws are also used to attach the corner blocks to the front frame rail and to the front end of the two side rails.

However, the attachment of the legs 40 to the rear end of the two side rails utilizes the ball and socket latch of the present invention. When the tailgate 20 is lowered and the flexible sheet 24 removed from the cargo box, the rear frame rail 30 is present, extending across the rear of the cargo box and inhibiting loading of large objects into the cargo box. Thus, it is necessary to provide a means to easily remove the rear frame rail for loading and unloading the cargo box. As mentioned above, thumb screws have previously been used to attach the rail to facilitate easy removal without the use of tools. However, the thumb screws can become lost.

Figure 3:
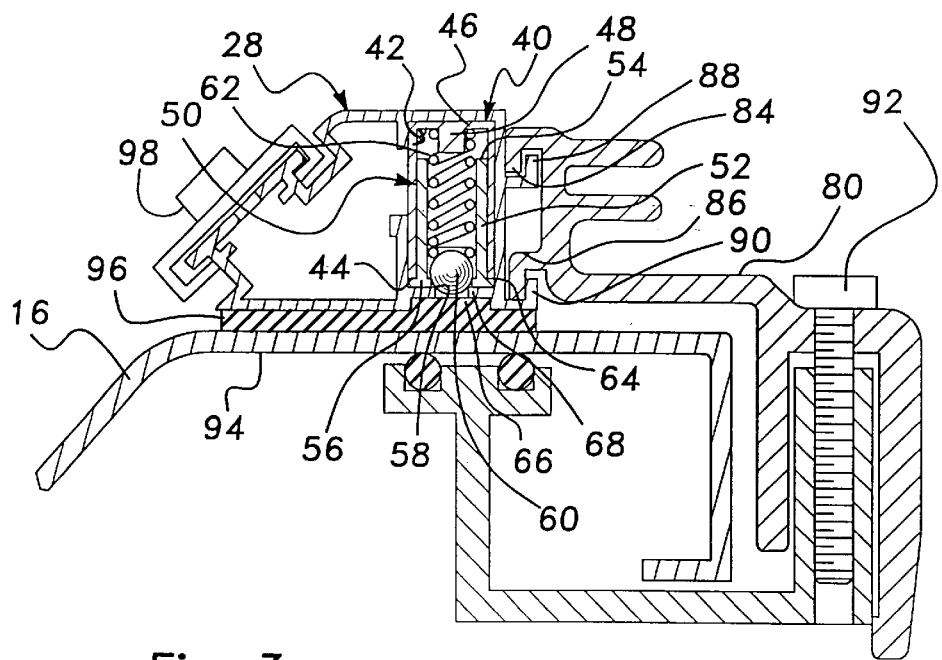
FIG. 3 is a sectional view of the tonneau cover frame showing the ball and socket latch of the present invention.
Figure 4:
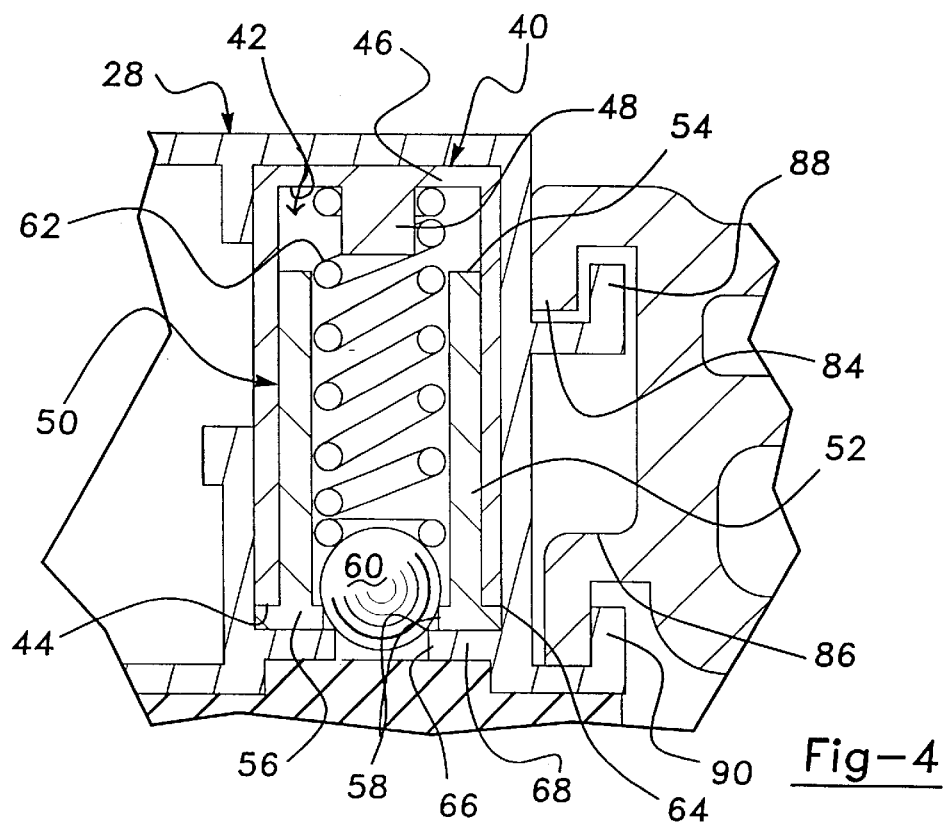
FIG. 4 is an enlarged sectional view showing the ball and socket latch of the present invention.

To overcome this disadvantage with thumbscrews, the present invention provides a ball and socket latch at each end of the rear rail to attach the rear rail to the two side rails. With reference to FIGS. 3 and 4, the ball and socket latch of the present invention is shown in greater detail. The leg 40 of corner block 32 extends into the hollow channel 42 in the side rail 28. The leg 40 is hollow and open at the bottom 44. The upper wall 46 of the leg 40 is cast with a downward locating stem 48. A ball and socket latch assembly 50 is inserted upward into the leg 40 and is press-fit there in. The assembly 50 includes a housing 52 having a cylindrical hollow interior which is open at its upper end 54. The bottom wall 56 of the housing has an aperture 58 which is smaller than the inside diameter of the housing 52. A ball 60 is placed into the housing which partially extends through the aperture 58 and below the housing bottom wall 56. A coil spring 62 is inserted into the housing above of the ball 60.

The ball and socket latch assembly 50, consisting of the housing 52, ball 60 and spring 62 is then press-fit into the leg 40 with the spring positioned over the locating stem 48. An outer peripheral flange 64 on the housing bottom wall 56 engages the bottom of the leg 40 as serves as a stop to the press fit insertion of the housing into the leg 40. A latch assembly 50 is installed in the corner block at each end of the rear rail.

An aperture 66 is formed in the bottom wall 68 of the channel 42. When the leg 40 is inserted into the end of the side rail, it extends into the side rail until the ball 60 is positioned over the aperture 66. The spring 62 forces the ball 60 into the aperture 66 and retains the ball therein. This secures the rear frame rail to the two side rails. The force of spring 62 is such that the ball will retain the rear frame rail attached to the side rails even when the pick-up truck is operated without the flexible sheet 24 in place. In such a condition, the ball and socket latch assembly is the only mechanism retaining the rear frame rail to the side rails.

When it is desired to remove the rear frame rail for loading large objects, the rear rail is removed by pulling rearward with sufficient force to overcome the spring 62 and unseat the ball from the aperture 66. When it is desired to re-install the rear frame rail, the legs 40 of the two corner blocks are inserted into the rear ends of the two side rails until the balls 60 seat into the apertures 66.

With reference to FIG. 3, a two-piece clamp having clamp members 80 and 82 is shown which is used to attach the side rail 28 to the cargo box. The clamp member 80 is attached to the side rail 28 by hanging the two downwardly open hooks 84 and 86 of the clamp member into the upwardly open hooks 88 and 90 of the side rails. The two clamp members 80 and 82 are attached to one another by a threaded fastener 92. This draws the clamp member 82 upward into contact with the inside surface 94 of the cargo box side wall while forcing the clamp member 80 and side rail 28 downward against the upper surface of the side wall, clamping the rail to the sidewall. A strip of foam tape 96 is positioned between the rail 28 and the sidewall to avoid marring the surface finish of the sidewall and to provide a water tight seal there between. A number of clamps are spaced along the length of each side rail. Other rail and clamp configurations can be utilized to attach the side rail such as that shown in U.S. Pat. No. 5,121,960 hereby incorporated by reference.

In the illustrated embodiment of the tonneau cover 10, the side rails carry a plurality of snap fasteners 98 which are used to secure the flexible sheet 24 to the tonneau cover frame. Complementary snap fasteners are attached to the sheet 24 about its periphery. The snap fastener 98 is shown as an example of one fastener for securing the flexible cover. Extruded hook fasteners, like that shown in the patent mentioned above, can be used as well as other fasteners. The means of fastening the flexible sheet to the frame rails and the means of fastening the rail to the cargo box are not a part of the present invention.

The ball and socket latch of the present invention provides a convenient, tool free, attachment of the rear frame to the frame side rails. This avoids the use of thumb screws which can become detached from the rear frame rail and lost. It is an advantage that the ball and socket latch of the invention is less costly than the thumb screws.

It is to be understood that the invention is not limited to the exact construction illustrated and described above, but that various changes and modifications may be made without departing from the spirit and scope of the invention as defined in the following claims.

We claim:

1. A frame for attaching a cover member to a pick-up truck cargo box having upright spaced side walls the frame comprising:

a pair of elongated side rails with one side rail on each of the cargo box sidewalls, the side rails having front and rear ends and a hollow channel extending longitudinally therein from the rear end;

a rear cross rail having opposite ends and extending between the two side rails at the rear ends thereof;

a corner block attached to each end of the rear rail, the corner blocks each having a body portion with a leg extending forward therefrom, the legs being disposed into the hollow channel at the rear end of the side rails; and a protruding member retainingly captured and permanently mounted in each of the legs, each protruding member being biased into a position protruding partially therefrom, each protruding member being aligned with an aperture in the side rail and seated therein to removeably latch the rear rail to the side rails, said rear rail and said corner blocks being mounted to said side rails by said protruding member for removal therefrom upon an application of force to said rear rail and without manual manipulation of said protruding member.

2. The frame of claim 1 wherein the protruding member is part of a latch assembly which includes a housing having a cylindrical interior chamber with an aperture at one end which allows the protruding member to protrude therefrom but which retains the protruding member therein, the assembly further including a compression spring to bias the protruding member to a position extending from the housing, the latch assembly being mounted in the leg of the corner block with the protruding member projecting therefrom for alignment with the aperture in the side rail whereby the rear rail is attached to the side rails.

3. The frame of claim 2 wherein the leg has an opening into which the housing of the latch assembly is press fit to mount the latch assembly to the leg.

4. The frame of claim 1 wherein the protruding member is a spherical ball.

5. A frame for attaching a cover member to a pick-up truck cargo box, the cargo box having spaced side walls, the frame comprising:

a pair of elongated side rails with one side rail on each of the cargo box side walls, the side rails having front and rear ends and a hollow channel extending into each side rail from the rear end thereof;

a rear cross rail having opposite ends and extending between the two side rails at the rear ends thereof; and means for removeably fastening the rear cross rail to the rear ends of the side rails to secure the rear cross rail thereto, the rear cross rail being removeable from the side rails without manual manipulation of said means by a rearward force on the rear cross rail while the side rails remain on the cargo box side walls, said means including a ball socket latch having a protruding member captured by the rear cross rail which extends from a surface of the rear cross rail that is inserted into the hollow channel at the rear end of the side rail and protrudes into an opening in the side rail to retain the rear cross rail thereto.

6. The frame of claim 5 wherein the rear cross rail includes corner blocks at the ends thereof each having a leg extending forward therefrom which are disposed into the hollow channel at the rear end of the side rails with the protruding member extending from a surface of each corner block leg.

7. The frame of claim 5 further comprising a front cross rail extending between the two side rails and attached to the front ends thereof and at least one ball socket latch for fastening the front rail to the side rails.

* * * * *